United States Patent Office 3,418,612
Patented Dec. 24, 1968

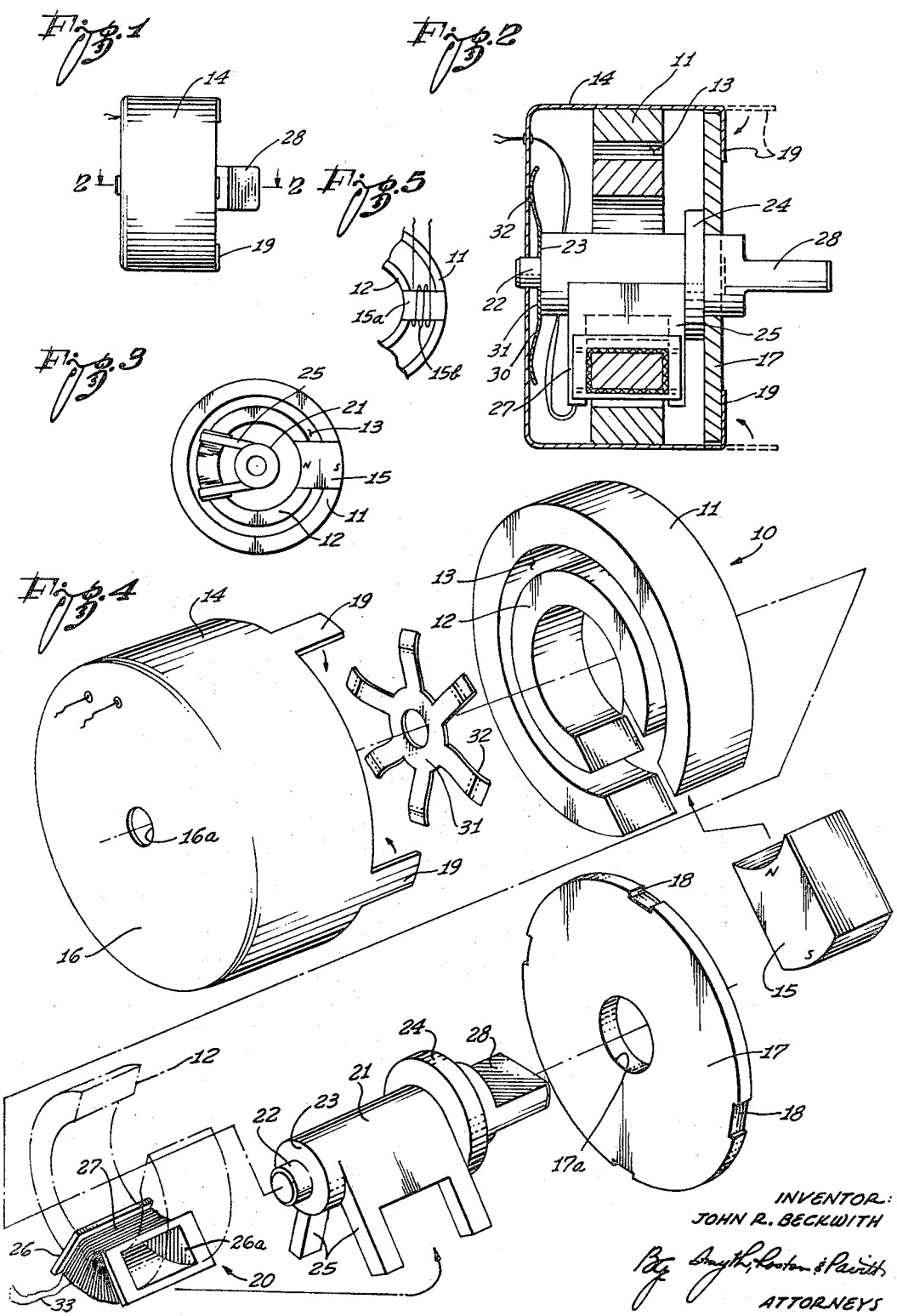

3,418,612
LIMITED MOTION MOTOR
John R. Beckwith, Pacific Palisades, Calif., assignor to Packard-Bell Electronics Corporation, Los Angeles, Calif., a corporation of California
Filed Aug. 1, 1966, Ser. No. 569,220
9 Claims. (Cl. 335—222)

ABSTRACT OF THE DISCLOSURE

A limited motion motor which includes a pair of magnetizable rings having radially aligned air gaps, a permanent magnet disposed in the air gap so that one of the rings constitutes a north pole and the other ring constitutes a south pole and a coil disposed on one of the rings. When current flows through the coil, the magnetic field becomes misaligned to produce a movement of the coil annularly on the one ring.

---

The present invention relates to a limited motion motor and is designed particularly toward miniaturization in the field of electromotion. The motor in accordance with the present invention is principally comprised of two rings concentrically disposed leaving a ring shaped gap space in between them. Each ring further has a gap, and the two gaps are aligned. A magnet, preferably a permanent magnet, is disposed in the two gaps in a manner that one pole of this magnet is in the gap of one ring, and the other pole of the magnet is in the gap of the other ring, so that the two rings are thereby polarized for assuming opposite magnetic polarity setting up a radially directed magnetic field across the ring gap in between them. A coil is seated on one of the rings. There may be a coil carrier to permit and facilitate sliding motion of the coil on this ring and the coil carrier is coupled to a shaft having its axis coaxial to the two rings.

Upon application of a D.C. current to the coil a magnetic field is set up which is misaligned in relation to the radial field between the two rings, and the tendency of this coil is to align itself with the field between the two rings; motion is thereupon imparted upon the coil, until coil, coil carrier and shaft are stopped by the permanent magnet. If a current flows or passes into this coil of sufficient strength so that the resulting magnetic field can overcome friction in the mechanical system and a sufficient starting torque develops, then the movement of the coil will thereafter occur rather rapidly. For certain applications, this may be desirable. However, in other fields of application, it may be desirable that the rotor moves rather slowly, particularly if the rotor coil is to be stopped in positions other than the terminal positions as defined by the magnet. Therefore, additional friction means may be coupled to the shaft in order to provide a drag sufficient to cause, on one hand, the coil to move rather slowly, and to permit, on the other hand, instant stopping as soon as current ceases to flow in the coil.

The limited motion motor as described and which will be described more fully with reference to the appended drawings finds utility particularly in cases of low power applications, because the principal aspects of the motor permits miniaturization of structure. The entire motor may have dimensions of half an inch or less. The motor may be used, for example, for the adjustment of potentiometers having a rotating glider or wiper arm. The motor shaft, as described above, will be coupled to this rotating potentiometer arm for imparting motion thereto. The structure of the motor inherently prevents the rotor coil from revolving completely, i.e., the shaft cannot perform a rotary motion of 360° about its axis. It is, therefore, an inherent safeguard that the potentiometer arm as actuated by this motor cannot possibly revolve completely by 360° but can reach one terminal position from the other terminal position only by running through the entire potentiometer range and not "backwards." If the coil is subjected, additionally, to the force of a spring, one can provide for balanced conditions as between this spring and the magnetic field as provided by the coil. For any particular current in the coil, the shaft has a particular angular position whereby the aligning force of the coil is balanced by spring tension. This way an instrument can be established in which a pointer hand coupled to the shaft can cover a range of almost 360° without, however, being possibly enabled ever to revolve completely around the axis.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGURE 1 illustrates a general view of a motor in accordance with the present invention;

FIGURE 2 illustrates a section view through the motor as shown in FIGURE 1 along lines 2—2 thereof;

FIGURE 3 illustrates a front view of the rotor and stator structure of the motor;

FIGURE 4 illustrates an exploded perspective view of the motor in accordance with the present invention; and FIGURE 5 illustrates a modification of the stator structure.

Proceeding now to the detailed description of the drawings, there is illustrated the structure of a limited motion motor which is the subject matter of the present invention. The motor is designed primarily for purposes of low power applications and miniaturized structures. The motor is comprised of a stator structure 10 and a rotor structure 20. The stator has a first outer ring 11 and an inner ring 12 concentrically disposed thereto, there being a ring-shaped gap 13 in between. The two rings each have a gap, and the gaps are in radial alignment. The two gaps receive a permanent magnet 15 which in effect closes the gaps of the rings and extends across gap 13.

The magnet 15 when positioned in the two gaps of the rings 11 and 12 polarizes the two rings 11 and 12. The ring 11, for example, becomes a magnetic south pole and the ring 12 becomes the magnetic north pole. The association of any ring with any particular polarity is arbitrary. The magnetic field established between the two rings across gap 13 extends radially in relation to the common axis of these rings 11 and 12; this magnetic field has the same radial direction in the entire gap space 13.

The ring 11 is, furthermore, mounted with its outer circumference to the inner wall of a housing 14 having a front wall 16 with an aperture 16a in which is received the bearing end 22 of a shaft 21. Bearing end 22 has a diameter smaller than the shaft 21, so that there is defined a shoulder ring 23 which axially limits the motion of the shaft 21 in relation to and towards the front wall 16 of the housing. The motor housing is further closed by a rear wall plate or disk 17 having a rather large opening 17a sufficient, for example, to clear the shaft 21 for its predominant diameter.

Shaft 21 is provided with a flange 24 having a diameter which is larger than the openings 17a so that the axial movement of the shaft 21 in housing 14 when closed by the plate 17 is restricted in the other axial direction to retain the shaft in the interior of the housing. The wall plate 17 has several circumferentially disposed indentations or notches 18 to receive tab ends 19 axially extending from housing 14 prior to mounting the plate 17 to housing 14. For mounting tabs 19 are first slid into notches 18 and then bent radially inwardly to lock plate 17 to housing 14.

The shaft 21 is provided with a yoke structure 25 which receives the rotor 20. This rotor 20 has a coil carrier 26 with an aperture 26a. A coil 27 is wound on carrier 26. The aperture 26a has a ring sector shaped configuration in one dimension and a rectangular configuration transversely thereto and in planes defining the winding planes of the coil 27. The coil carrier 26 is received by the stator pole ring 12 traversing the aperture 26a.

One can see that magnet 15 as it extends through gap 13 limits the motion of the rotor 20. Thus the wire connections from inlets 33 to coil 27 can be made flexible, and, therefore, there is permanent electrical connection between the coil 27 and the power supply source (not shown), thus obviating a collector structure for this motor.

The essential part of the stator is that the ring carrying the rotor coil sets up a radially extending magnetic field. The other ring, here ring 11, then provides the magnetic return path together with magnet 15 itself, permitting the stator field to extend radially adjacent to ring 12 in uniform radial direction throughout the gap space 13.

A friction spider ring 30 is also mounted on the shaft end 22 to provide for a drag on the rotor and the shaft 21. The spider ring 30 may be seated on shaft end 22 with its central ring 31 which abuts shoulder 23, and radially extending arms 32 of spider 30 resiliently bear against the inner wall of end wall 16. The other end of the shaft 21 is provided with a flat, key element 28 which has a configuration similar to a screwdriver head for insertion into a slot. This portion is of no immediate importance and the configuration of this end of the shaft 21 will depend to a considerable extent on the intended use of the motor, and on the desired way of coupling the driving shaft to the load.

Without current flowing in coil 27, rotor 20 can retain any position on the ring 12 except that the magnet 15 prevents the rotor 20 from making a complete revolution. When a D.C. current flows in the coil 27 in a particular direction, a particular magnetic field is set up by the coil 27 tending to align the coil 27 with the magnetic field as it extends radially from ring 12 to ring 11 across gap 13. One can see the following rules with regard to this tendency of alignment.

If the magnetic field as set up by the coil 27 has a polarity such that the north pole faces the north pole of the energizing stator magnet 15, then a torque is set up tending to move the north pole of the coil away from the north pole of the magnet 15. This torque causes the rotor 20 to slide along the ring 12 until the south pole of the coil 27 abuts the north pole of stator magnet 15 from the other side. Of course these considerations have meaning only with regard to the position chosen for the poles of energizing magnet 15, relative to the two rings. In case of a polarity reversal of magnet 15 the considerations are reversed correspondingly. After coil 27 has been energized as described, the rotor 20 will maintain the position with its south pole facing the north pole of the magnet 15 even after the current in coil 27 is turned off later on.

If subsequently the current in the coil 27 is reversed, rotor 20 will move in the opposite direction. Thus, the rotor will move always so that the south pole of its coil moves towards the north pole of magnet 15. Due to the yoke structure 25, shaft 21 is forced to follow the sliding motion of rotor 20 on ring 12 and, therefore, shaft 21 will rotate about the system axis. In other words, the torque set up by the tendency of coil 27 to align itself with the stator field is translated into a torque around the axis of shaft 21 as this is the only motion coil 27 and all elements coupled thereto can perform.

The pivot motion of coil 27 and shaft 21 with its actuator piece 28 covers a total angular range somewhat below 360°; how much less than 360° depends on the dimensions of the magnet 15 and the coil carrier 26. The smaller the magnet and coil carrier in azimuthal direction, the closer will be the pivot angle to 360°. If at any time during such motion of the rotor the current for the coil 27 is turned off, the rotor will come at rest. As the friction spider tends to retard the motion of shaft 21, the rotor with shaft will stop rather instantly when the current in coil 27 is interrupted. It therefore appears that the rotor 20 can be moved from any position to any position on the ring 12 by operation of current pulses of controlled duration in the coil 27. Since the friction spider 30 slows the motion of the rotor, the rotor can be made to stop at rather accurately defined positions on the ring 12.

There will be some friction between the flange 24 and the cover plate 17. However, such friction is actually desired, and the provision of the spider 30 shows that the shaft-housing friction is not sufficient to provide the drag necessary to ensure that the angular position of the shaft can be accurately controlled. On the other hand, if for reasons of fast action, friction in fact is to be avoided, then there may be ball bearings and/or other friction reducing devices interposed between shaft structure and housing structure, and spider 30 will be omitted in order to have the shaft rotate as friction-free as possible.

In the preferred field of application this limited action motor can be used, for example, to operate a rotary potentiometer. The shaft 21 is coupled through this connecting piece 28 to a rotatable wiper arm of a potentiometer. By means of timed energization of the rotor 20, the potentiometer arm can be shifted from any to any position. The structure of the motor prevents the wiper arm of the potentiometer from making a complete revolution, and the extreme positions of the potentiometer are defined by abutment of the rotor coil 27 to one side or the other side of that portion of magnet 15 which extends across gap 13. The remote control of adjustable elements in a television set is an example of an advantageous way of using this miniature motor.

Another way of using this motor, for example, is in a metering instrument. The shaft 21 may additionally be subjected to the force of a coil spring, the resilient force of which would tend to oppose the motion of the shaft. The magnetic energizing field resulting from a particular current will cause the coil spring to compress, or expand as the case may be. If the resilient constant of this spring is constant indeed, then the angle of permissible rotation of the shaft 21 is proportionate to the current which flows in the coil 27. For a particular magnetic field as resulting from a particular current in coil 27 there is a balance of forces. The angular deflection of the rotor can thus be used as a representation of the current in the coil 27.

It can be seen that if the shaft 21 is coupled to a pointer, the pointer is enabled now to cover a range of almost 360°, so that an instrument equipped with a limited motion motor in accordance with the invention can in fact be operated over a very large circular indicating range.

The motor can be used, for example, as a pulse counter in which each pulse has a particular, accurately known and controlled duration causing the rotor to move in angular steps. Such a pulse counter would be a bidirectional counter to which the pulses of one polarity would cause the rotor coil 20 for example to move in one direction and the pulses of another polarity would cause the rotor to move in the other direction, or there may be two coils on carrier 26 wound to set up opposite fields. Again by coupling the shaft 21 to a pointer hand one obtains immediately the result of the counting.

It is a very advantageous, structural convenience to use the magnet for both polarizing the two rings as well as for preventing the rotor 20 from revolving completely. There is, however, the possibility of separating these two functions. If, for example, the range of motion of the motor is to be restricted further, one could widen the gap and use two magnets. In the structure as illustrated additional stop means may be provided in gap 13 to further restrict the angular range of motion for the rotor 20.

It can be seen that the motor as shown permits certain other modifications if necessary. However, the structure as shown is the preferred form of practicing the invention. For example, there is of course no necessity that the stator magnet 15 is a permanent magnet, but this element 15 may, for example, be a magnetizable core element or soft iron, such as core 15a in FIGURE 5, which may be somewhat larger than the permanent magnet 15 and which is provided with a suitable core 15b through which a current flows for purposes of magnetizing the two rings. Thus the essential feature of the invention is the actual magnetic polarization of the two rings 11 and 12.

If a magnetizable core element which is shown as a permanent magnet 15 is changed to soft iron, for example, and a coil of wire wound around it to form a magnet of varying intensity, depending on the amount of current through the coil, then coil 27 may be substituted by a short-circuited coil, such as one turn of metallic conductor such as copper. The short circuitry of the coil 27 is illustrated by broken lines in FIGURE 4. Then the motor will respond to rate of change of current to its winding. The amount of motion of the rotor then would be proportional to the rate of change of current. Computers and other devices may find considerable use for such a device.

I claim:
1. A limited motion motor comprising:
   a pair of concentrically positioned, magnetizable rings, there being a ring-shaped gap space in radial direction between the pair of rings;
   a magnet coupled to the two rings and positioned to magnetically polarize the two rings to provide one of the rings with a north pole and the other ring with a south pole, the magnet extending across said gap space between the two rings;
   a coil slidably seated on one of the rings, the coil being wound so that upon flow of current in the coil the magnetic field is misaligned with the magnetic field as between the two rings due to polarization by said magnet to obtain a sliding motion of the coil on the one ring; and
   means coupled to the coil for converting the sliding motion of the coil on said one ring into a rotary motion about an axis running through the center of the ring.

2. A motor as set forth in claim 1, there being friction drag means coupled to the last means for slowing the motion of the coil.

3. A motor as set forth in claim 1, each of the rings having a gap, the two gaps being radially aligned and receiving said magnet.

4. A motor as set forth in claim 1, said magnet being a permanent magnet.

5. A limited motion motor comprising:
   a pair of concentrically positioned magnetizable rings having a ring-shaped air space between them, each of said rings having a gap, the two gaps being aligned in radial direction;
   at least one magnet positioned in the two gaps to magnetically polarize the two rings and provide one of the rings with a north pole and the other ring with a south pole so that a radially directed magnetic field is set up across said air space;
   a coil slidably seated on one of the rings, the coil being wound so that upon flow of current in the coil the magnetic field produced by the current in the coil is misaligned with the magnetic field as between the two rings to obtain a sliding motion of the coil on the one ring; and
   a shaft with a yoke, the shaft being positioned so that its axis runs through the common center of said rings, the yoke carrying said coil so that the sliding motion of the coil is converted into rotary motion of said shaft around said axis.

6. A limited motion motor:
   a magnetizable ring;
   a magnet having one of its poles coupled to the ring so that a magnetic field extends radially uniform from the ring except for the area where the ring is coupled to the magnet;
   means for providing a magnetic return path for the magnet to sustain said radial magnetic field in a ring-shaped environment of said magnetizable ring;
   a coil seated on said ring and having its winding axis transverse to said field and responsive to a flow of current in the coil to provide a sliding motion of the coil on the ring; and
   means coupled to said coil to translate any sliding motion of the coil on the ring into a rotary motion of the coil about the axis of the ring.

7. A limited motion motor, comprising:
   means for providing a radially directed magnetic field of radially uniform direction and extending in relation to an axis and over a ring-shaped gap space except for a relatively small region providing a magnetic return path in the opposite radial direction;
   a curved electric conductor movably disposed in said gap space, having a curvature so that upon flow of electric current through the conductor a magnetic field is set up, the field being azimuthally directed in relation to the ring-shaped gap space for any position of the conductor in the gap space; and
   means responsive to the movement of the conductor in the gap space outside of said return path and resulting from misalignment of the magnetic field as set up by the conductor when passed through by an electrical current and of the field in said gap space, for providing a rotary motion over an angular range of less than 360° about said axis.

8. A limited motion motor comprising:
   a pair of concentrically positioned magnetizable rings, each having a gap, the gaps being aligned;
   a magnet in the two gaps and positioned to magnetically polarize the two rings to provide a north pole at one of the rings and a south pole at the other ring;
   a coil slidably seated on one of the rings, the coil being wound so that upon flow of current in the coil the resulting magnetic field produced by the current in the coil is misaligned with the magnetizable field as between the two rings to provide for a sliding motion of the coil on the one ring; and
   means coupled to the coil for converting the sliding motion of the coil on said one ring into a rotary motion of the coil about an axis running through the common centers of the rings.

9. A limited motion motor comprising:
   a pair of concentrically disposed magnetizable rings, each having a gap, the gaps being radially aligned;
   means in the two gaps for providing a variable strength magnetic field to polarize the two rings to respectively assume opposite polarities at variable pole strengths;
   a short-circuited coil movably disposed on one of the rings; and
   means responsive to movements of the coil and movable with the coil to provide a rotary motion over a limited range.

References Cited

UNITED STATES PATENTS 2,848,662 8/1958 Barry et al. _____ 335—222
3,181,065 4/1965 Bajars _____ 335—222 XR GEORGE HARRIS, *Primary Examiner.*

U.S. Cl. X.R.

335—226, 229